US011350350B2

(12) United States Patent
Andonieh et al.

(10) Patent No.: US 11,350,350 B2
(45) Date of Patent: May 31, 2022

(54) DIRECTIONAL SCAN AND CONNECTION MECHANISMS IN WIRELESS COMMUNICATIONS SYSTEMS

(71) Applicant: PERASO TECHNOLOGIES INC., Toronto (CA)

(72) Inventors: Joseph Andonieh, Aurora (CA); Bradley Robert Lynch, Toronto (CA); Albert Klaas Theodoor Rietema, Guelph (CA); Timor Israeli, Toronto (CA); Ali Reza Khodaian Zavareh, Waterloo (CA); Miles Hu, Toronto (CA)

(73) Assignee: PERASO TECHNOLOGIES INC., Toronto (CA)

(*) Notice: Subject to any disclaimer, the term of this patent is extended or adjusted under 35 U.S.C. 154(b) by 0 days.

(21) Appl. No.: 16/705,867

(22) Filed: Dec. 6, 2019

(65) Prior Publication Data
US 2020/0187102 A1    Jun. 11, 2020

Related U.S. Application Data

(60) Provisional application No. 62/776,456, filed on Dec. 6, 2018.

(51) Int. Cl.
*H04W 48/16* (2009.01)
*H04W 48/08* (2009.01)
(Continued)

(52) U.S. Cl.
CPC .......... *H04W 48/16* (2013.01); *H04W 48/08* (2013.01); *H04W 72/02* (2013.01); *H04W 72/046* (2013.01); *H04W 76/10* (2018.02)

(58) Field of Classification Search
CPC ..... H04W 76/00; H04W 88/08; H04W 48/16; H04W 48/08; H04W 72/02; H04W 72/046; H04W 76/10
See application file for complete search history.

(56) References Cited

U.S. PATENT DOCUMENTS

| 2009/0041156 A1* | 2/2009 | Lakkis | ............... H04L 27/2602 375/300 |
| 2009/0052389 A1 | 2/2009 | Qin et al. | |

(Continued)

FOREIGN PATENT DOCUMENTS

| WO | WO-2015020300 A1 * | 2/2015 | ............ H04W 24/02 |

OTHER PUBLICATIONS

EPO, Extended European Search Report, dated Mar. 31, 2020, re European Patent Application No. 19213603.4.

(Continued)

*Primary Examiner* — Ayanah S George
(74) *Attorney, Agent, or Firm* — Perry + Currier

(57) ABSTRACT

A method in a wireless access point (AP) having an antenna controllable to transmit and receive using a set of AP sectors, includes: transmitting a plurality of beacon instances using each of the AP sectors, each beacon instance associated rotation schedule data defining a plurality of listening time slots corresponding to respective AP sectors; activating a rotating listening mode using the AP sectors in sequence according to the rotation schedule data; in response to detecting a sector sweep initiation message from a client device using an active one of the AP sectors, communicating with the client device to select an AP sector to use in establishing a link with the client device.

10 Claims, 6 Drawing Sheets

(51) Int. Cl.
*H04W 72/02* (2009.01)
*H04W 72/04* (2009.01)
*H04W 76/10* (2018.01)

(56) References Cited

U.S. PATENT DOCUMENTS

| | | | |
|---|---|---|---|
| 2011/0205969 A1* | 8/2011 | Ahmad | H04W 16/28 370/328 |
| 2012/0008608 A1 | 1/2012 | Iacono et al. | |
| 2016/0241314 A1* | 8/2016 | Ferrante | H04B 7/0452 |

OTHER PUBLICATIONS

Wang, James (Mediatek), "Sectorized Beam Operation," IEEE SA Mentor, Sep. 14, 2012, 11-12-1103-00-00AH-Sectorized-Beam-Operation, Piscataway, NJ, USA, vol. 802.11ah, pp. 1-16. Retrieved from the Internet on Sep. 18, 2012.

\* cited by examiner

DIRECTIONAL SCAN AND CONNECTION MECHANISMS IN WIRELESS COMMUNICATIONS SYSTEMS

CROSS-REFERENCE TO RELATED APPLICATION

This application claims priority from U.S. Provisional Patent Application No. 62/776,456, filed Dec. 6, 2018, the contents of which is incorporated herein by reference.

FIELD

The specification relates generally to wireless communications systems, and specifically to a method and system for implementing directional scanning and connection mechanisms in wireless communications systems.

BACKGROUND

Some wireless communications systems, such as those implemented according to the Institute of Electrical and Electronics Engineers (IEEE) 802.11ad standard, employ beamforming between communication devices (e.g. between client devices and access points) to improve transmission range and/or throughput. Before beamforming has been performed between two devices, either or both of the devices may await receipt of initiation messages using an antenna configuration that provides a wider beam width than that employed for subsequent communications.

The greater beam width afforded by the above-mentioned antenna configuration, however, may reduce the reception sensitivity of the antenna. When the devices are sufficiently distant from one another, the device operating in the above antenna configuration may not detect transmissions from the other device, preventing beamforming and subsequent connection from being initiated.

SUMMARY

An aspect of the specification provides a method in a wireless access point (AP) having an antenna controllable to transmit and receive using a set of AP sectors, the method comprising: transmitting a plurality of beacon instances using each of the AP sectors, each beacon instance associated with rotation schedule data defining a plurality of listening time slots corresponding to respective AP sectors; activating a rotating listening mode using the AP sectors in sequence according to the rotation schedule data; in response to detecting a sector sweep initiation message from a client device using an active one of the AP sectors, communicating with the client device to select an AP sector to use in establishing a link with the client device.

Another aspect of the specification provides an access point, comprising: an antenna array controllable to transmit and receive using a set of AP sectors; a controller connected to the antenna array and configured to: control the antenna array to transmit a plurality of beacon instances using each of the AP sectors, each beacon instance associated with rotation schedule data defining a plurality of listening time slots corresponding to respective AP sectors; activate a rotating listening mode using the AP sectors in sequence according to the rotation schedule data; and in response to detection of a sector sweep initiation message from a client device using an active one of the AP sectors, communicate with the client device to select an AP sector to use for establishing a link with the client device.

A further aspect of the specification provides a method in a wireless client device having an antenna controllable to transmit and receive using a set of client sectors, the method comprising: activating a rotating listening mode using the client sectors in a predefined sequence; in response to detecting a beacon from an access point (AP) associated with rotation schedule data defining a plurality of listening time slots corresponding to respective AP sectors of the AP, determining a transmission time based on the rotation schedule data; and at the transmission time, transmitting a message to the AP.

A still further aspect of the specification provides a wireless client device, comprising: an antenna array controllable to transmit and receive using a set of client sectors; a controller connected to the antenna array and configured to: activate a rotating listening mode using the client sectors in a predefined sequence; in response to detecting a beacon from an access point (AP) associated with rotation schedule data defining a plurality of listening time slots corresponding to respective AP sectors of the AP, determine a transmission time based on the rotation schedule data; and at the transmission time, transmit a message to the AP.

BRIEF DESCRIPTIONS OF THE DRAWINGS

Embodiments are described with reference to the following figures, in which.

DETAILED DESCRIPTION

Figure 1:
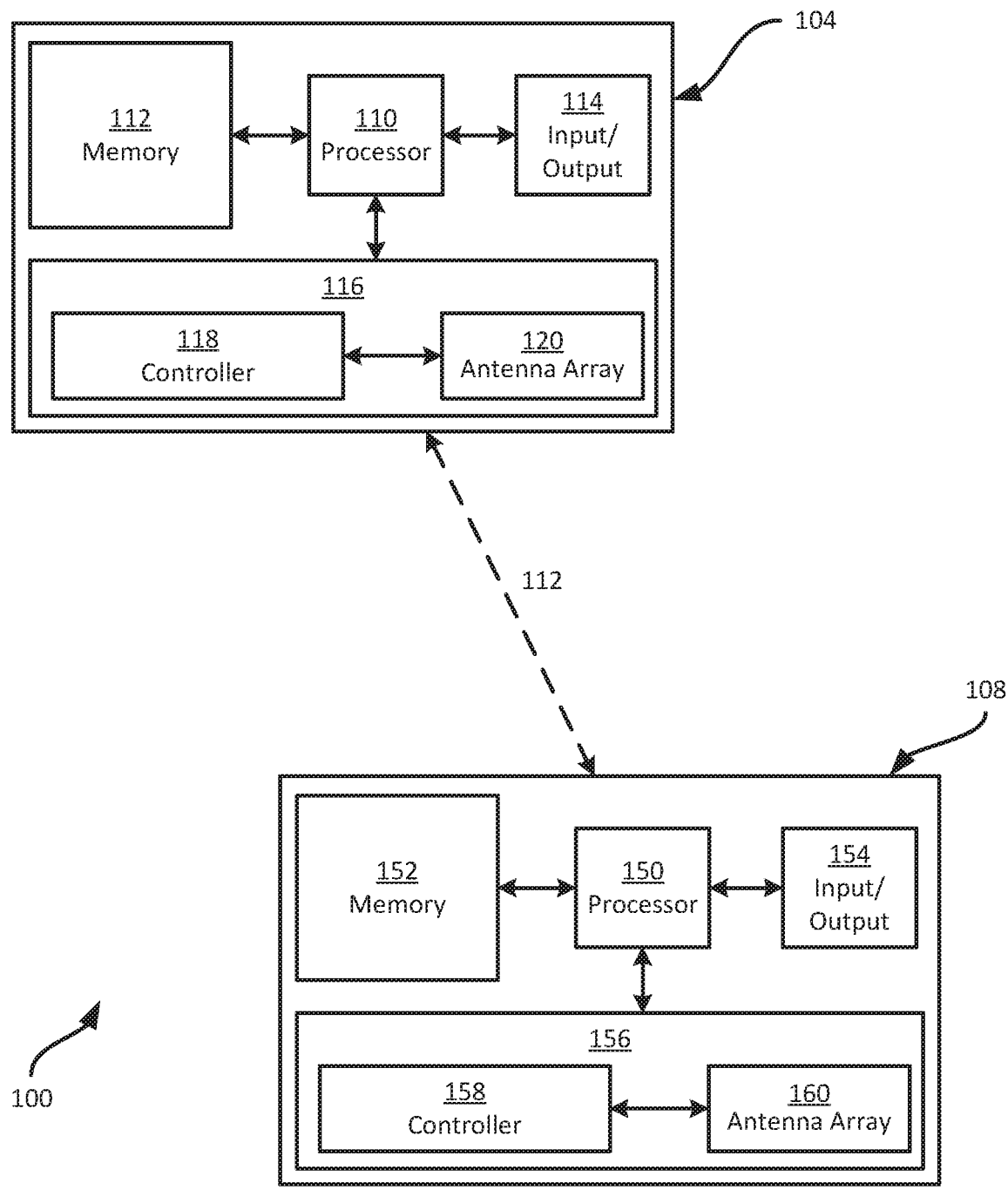
FIG. 1 is a diagram illustrating a wireless communication system.

FIG. 1 depicts a wireless communications system 100, including a plurality of wireless devices. In particular, FIG. 1 illustrates an access point (AP) 104 connected with a client device 108 (also simply referred to as the client 108) via a wireless link 112. The access point 104 can be, for example, a wireless router connecting the client device 108 to a wide area network (not shown) such as the Internet. The access point 104 may also be, for example, a media server, a home computer, a mobile device, and the like. More generally, the AP 104 as referred to herein includes any wireless device implementing point coordinator (PC) functionality.

The client device 108, meanwhile, can be a mobile device such as a smartphone, a tablet computer and the like. The client device 108 may also be an access point itself, for example in implementations in which the devices 104 and 108 are components in a backhaul infrastructure. More generally, the access point 104 includes any computing device suitable to deploy a wireless local-area network (WLAN). The client device 108, meanwhile, includes any computing device suitable to join the above-mentioned WLAN.

The AP 104 and client 108 include respective central processing units (CPU) 110 and 150, also referred to as processors 110 and 150. The processors 110 and 150 are interconnected with respective non-transitory computer readable storage media, such as memories 112 and 152, having stored thereon various computer readable instructions for performing various actions. The memories 112 and 152 each include a suitable combination of volatile (e.g. Random Access Memory or RAM) and non-volatile memory (e.g. read only memory or ROM, Electrically Erasable Programmable Read Only Memory or EEPROM, flash memory). The processors 110 and 150 and the memories 112 and 152 each comprise one or more integrated circuits.

The AP 104 and client 108 also include respective input and output assemblies 114 and 154. The input and output assemblies 114 and 154 serve to receive commands from operators of the devices to control the operation thereof, and to present information, e.g. to the above-mentioned operators. The input and output assemblies 114 and 154 therefore include any suitable combination of keyboards or keypads, mice, displays, touchscreens, speakers, microphones, and the like. In other embodiments, the input and output assemblies 114 and 154 may be connected to the processors 110 and 150 via a network, or may simply be omitted. For example, the access point 104 may omit the input/output assembly 114.

The AP 104 and client 108 further include respective wireless communications assemblies 116 and 156 interconnected with the processors 110 and 150. The assemblies 116 and 156 enable the AP 104 and client 108, respectively, to communicate with other computing devices, including each other. In the present example, the assemblies 116 and 156 enable such communication according to wireless standards employing frequencies of around 60 GHz (also referred to as WiGig) and wide channel bandwidths (e.g. exceeding 1 GHz per channel). Examples of such standards are the IEEE 802.11ad standard, and enhancements thereto (e.g. 802.11ay). The assemblies 116 and 156 can also be configured to enable communications according to a variety of other standards, however, including other members of the 802.11 family of standards.

The communications assemblies 116 and 156 include respective controllers 118 and 158 in the form of one or more integrated circuits, configured to establish and maintain communications links with other devices (e.g., the link 112). The controllers 118 and 158 are configured to process outgoing data for transmission via respective antenna arrays 120 and 160 (e.g. each including a phased array of antenna elements) and to receive incoming transmissions from the arrays 120 and 160 and process the transmissions for communication to the processors 110 and 150. The controllers 118 and 158 can therefore each include a baseband processor and one or more transceivers (also referred to as radio processors), which may be implemented as distinct hardware elements or integrated on a single circuit.

In order to enable communications with another device, each of the AP 104 and the client 108 is configured to implement various functions to establish a communications link such as the link 112 shown in FIG. 1. Among the functions implemented by the AP 104 and client 108 is a mechanism permitting the devices to detect one another in order to initiate the establishment of a beamformed connection such as the link 112.

As will be apparent to those skilled in the art, wireless communication devices that employ beamforming include antenna arrays (such as the arrays 120 and 160 shown in FIG. 1) that can be controlled to transmit or receive according to a variety of radiation patterns. The radiation patterns may also be referred to as sectors, and the controllers 118 and 158 can store sets of configuration parameters corresponding to each sector. A given sector can be activated, in other words, by applying the corresponding configuration parameters to the relevant antenna array.

Figure 2:
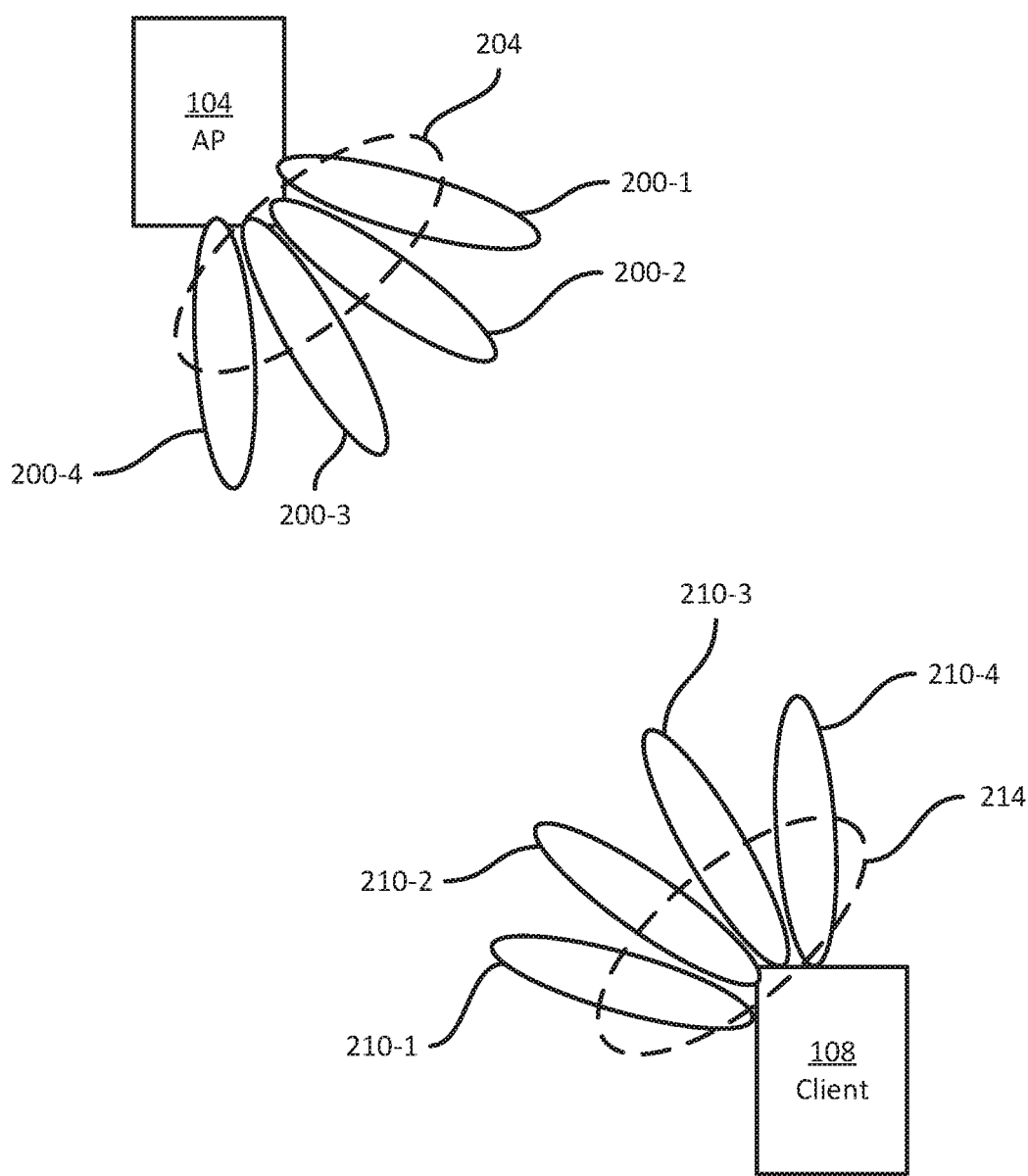
FIG. 2 is a diagram illustrating example radiation patterns of antenna arrays in the system of FIG. 1.

Turning briefly to FIG. 2, the AP 104 and client 108 are shown with example sectors. In particular, the AP 104 is illustrated with four example AP sectors 200-1, 200-2, 200-3 and 200-4, as well as with an AP quasi-omni sector 204. A variety of additional sectors and/or quasi-omni sectors can also be implemented by the AP 104, and those shown in FIG. 2 are provided solely for illustrative purposes. The client 108 is also illustrated with four example client sectors 210-1, 210-2, 210-3 and 210-4, as well as a quasi-omni client sector 214. The quasi-omni sectors 204 and 214 have greater beam angles than the sectors 200 and 210 (which may also be referred to as directional sectors). The quasi-omni sectors 204 and 214, however, also have smaller effective ranges than the directional sectors 200 and 210.

Before the link 112 has been established, the AP 104 transmits beacon frames. If the client 108 uses the quasi-omni sector 214 to detect the beacons, the client 108 may be unable to detect the beacons beyond certain distances from the AP 104 (e.g. about 300 m for 802.11ad communications). Similarly, the AP 104 may use the quasi-omni sector 204 to detect requests to initiate connections from client devices such as the client 108, but if the client 108 is sufficiently distant from the AP 104, the AP 104 may fail to detect such requests.

Reception of a beacon at the client 108 over such distances may be feasible using a directional sector 210, and reception of a request to initiate a connection at the AP 104 over such distances may be feasible using a directional sector 200. Therefore, the AP 104 and the client 108 are each configured to perform various actions to detect which directional sector 200 and 210 to employ for initiation of a connection. In other words, the functionality implemented by the AP 104 and the client 108, to be discussed in detail herein, enables the AP 104 and client 108 to avoid relying on the quasi-omni sectors 204 and 214 to establish connections.

Figure 3:
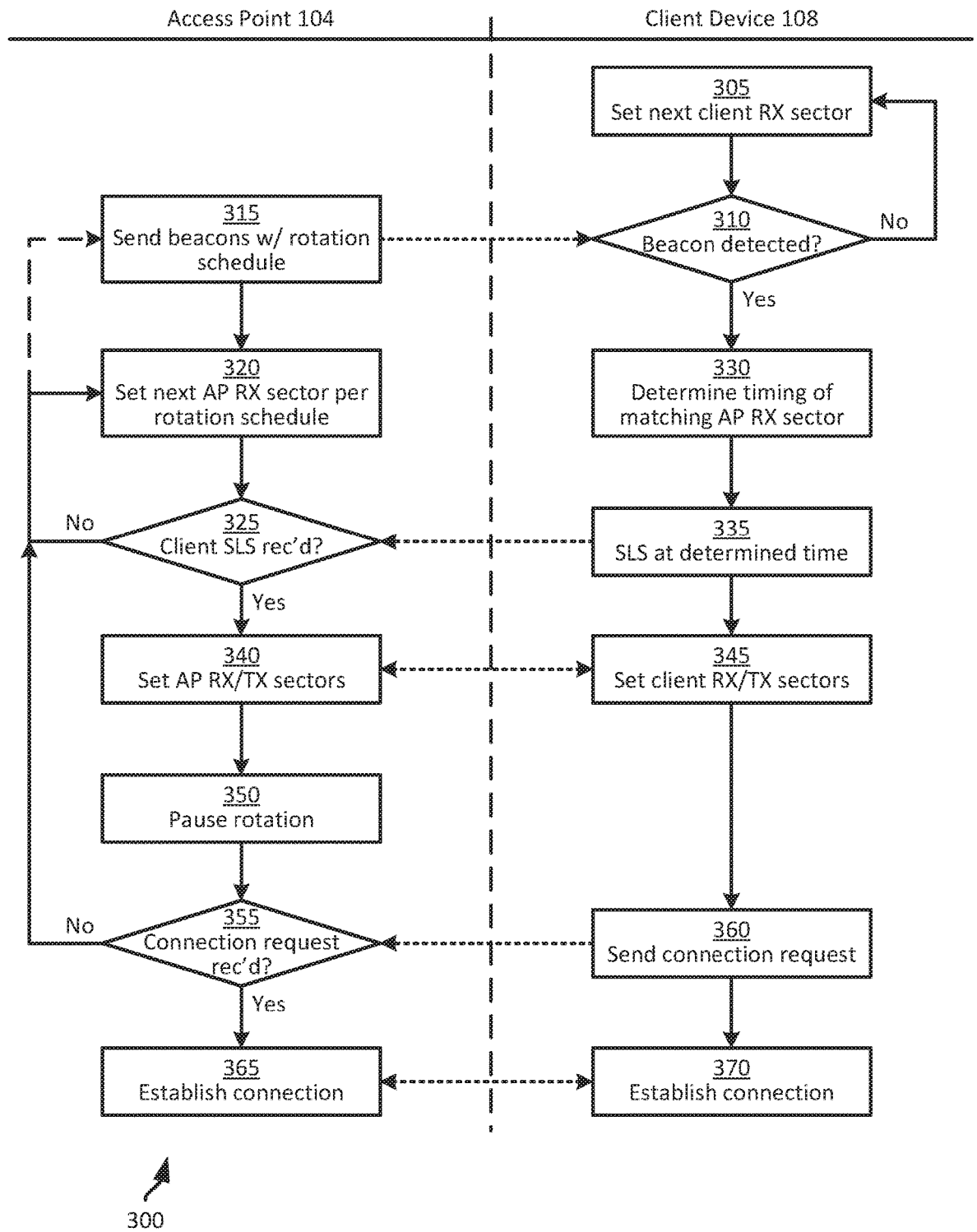
FIG. 3 is a flowchart of a method for directional beam scanning and connection.

Turning now to FIG. 3, a method 300 for directional scanning and connection will be discussed in connection with its performance within the system 100. In particular, certain blocks of the method 300 are performed by the AP 104, while other blocks of the method 300 are performed by the client 108, as indicated in FIG. 3.

It is assumed, at the initiation of the performance of the method 300, that the AP 104 and the client 108 have not established a connection such as the link 112. At block 305 the client 108 selects, from among the client sectors 210, an active sector to use for operating in a receiving (RX), or listening, mode to detect a beacon from the AP 104. Of particular note, the quasi-omni sector 214 is omitted from the set of sectors employed to set an active sector at block 305. That is, the client 108 employs only the directional sectors 210 at block 305. Further discussion of the selection of a sector at block 305 will be provided further below.

At block 310, the client 108 (e.g. the controller 158 more specifically) determines whether a beacon has been detected using the sector set at block 305. When the determination is negative, the client 108 returns to block 305 to select the next active sector 210 to use in the listening mode. In other words, the client 108 cycles through the sectors 210, omitting use of the quasi-omni sector 214, to listen for beacons from the AP 104.

At block 315, the AP 104 sends a plurality of beacon instances. For example, the AP 104 can control the antenna array 120 to transmit a beacon frame using each sector 200, such that if the antenna array 120 has sixteen sectors, sixteen beacons are transmitted in succession. The beacons contain various information employed by the client 108 and other client devices to establish connections with the AP 104. Such information includes a network address of the AP 104, an identifier of the WLAN implemented by the AP 104, and the like. Each beacon also includes a sector identifier, corresponding to the sector 200 used to transmit that beacon.

In addition, the beacons transmitted at block 315 contain rotation schedule data. The rotation schedule data defines a plurality of listening time slots corresponding to respective AP sectors 200. Rather than listening for client connection requests using the quasi-omni sector 204, the AP 104 listens for client connection requests using the directional sectors 200 in sequence. The rotation schedule data defines that sequence. The transmission of the rotation schedule data in the beacons enables any client devices that receive a beacon to determine when the AP 104 will be listening on a given sector 200, as will be discussed further below. In other examples, the rotation schedule data need not be contained in the beacons themselves but is otherwise associated with the beacons. For example, the client 108 can store predetermined rotation schedule information, or can retrieve the rotation schedule information from another source (e.g. another client device).

Figure 4A:
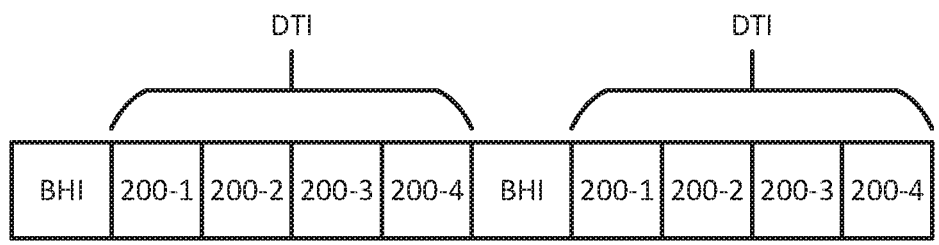
FIGS. 4A, 4B and 4C are diagrams illustrating examples of rotation schedules employed in the method of FIG. 3.
Figure 4B:
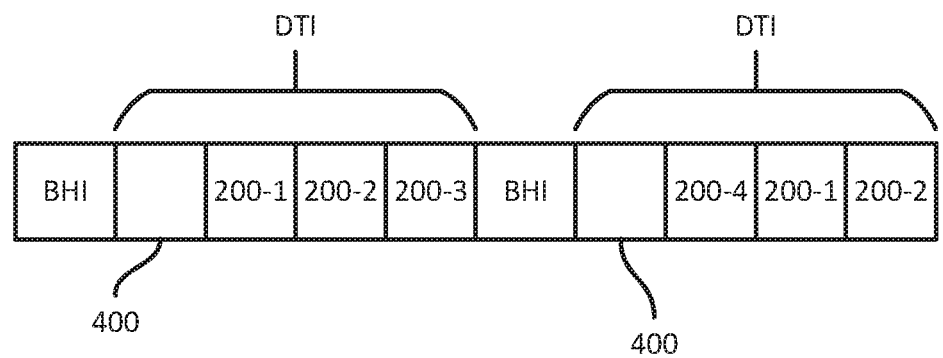
Figure 4C:
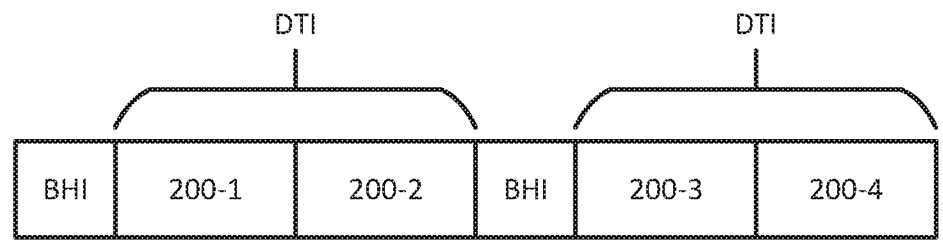

Turning to FIGS. 4A, 4B and 4C, examples of the above-mentioned listening time slots are illustrated. As will be apparent to those skilled in the art, the AP 104 implements, in the above-mentioned WLAN, a beacon header interval (BHI) during which beacons are sent, and a data transmission interval (DTI) during which the AP 104 and client devices can exchange data. The listening time slots defined in the rotation schedule data are implemented during the DTI. FIGS. 4A-4C each illustrate an example division of the DTI into listening time slots, with an identifier of a given sector 200 indicating which sector 200 is active during the relevant time slot.

In the example of FIG. 4A, the DTI is divided into a number of listening time slots equal to the number of available sectors 200, excluding the quasi-omni sector 204. The AP 104 rotates through each of the sectors 200-1 to 200-4 in a listening mode during a single DTI. In the subsequent DTI, the rotation is therefore repeated. In other words, during each DTI the AP 104 activates the listening mode using each sector 200 for one quarter of the DTI. As will be apparent, the DTI may be subdivided into smaller slots for greater numbers of sectors 200.

In the example of FIG. 4B, the same subdivision of the DTI into four slots is employed as in FIG. 4A. However, the activation of the listening mode is offset by one slot. That is, a slot 400 is not assigned to any sector 200 and the AP 104 does not activate the listening mode during the slot 400. Rotation through the sectors 200 therefore consumes more than one DTI, with the sector 200-4 being activated in the second DTI as shown in the illustration.

In the example of FIG. 4C, the DTI is subdivided into two slots rather than four, with the result that two DTIs are used to accommodate rotation through the four sectors 200. As will now be apparent, a wide variety of other arrangements can also be implemented to subdivide the DTI into listening time slots and assign such slots to specific sectors 200. For example, in another embodiment a single one of the sectors 200 can be assigned to each DTI, such that rotating through each sector 200 requires four DTIs (and four associated beacon transmissions).

Figure 5:
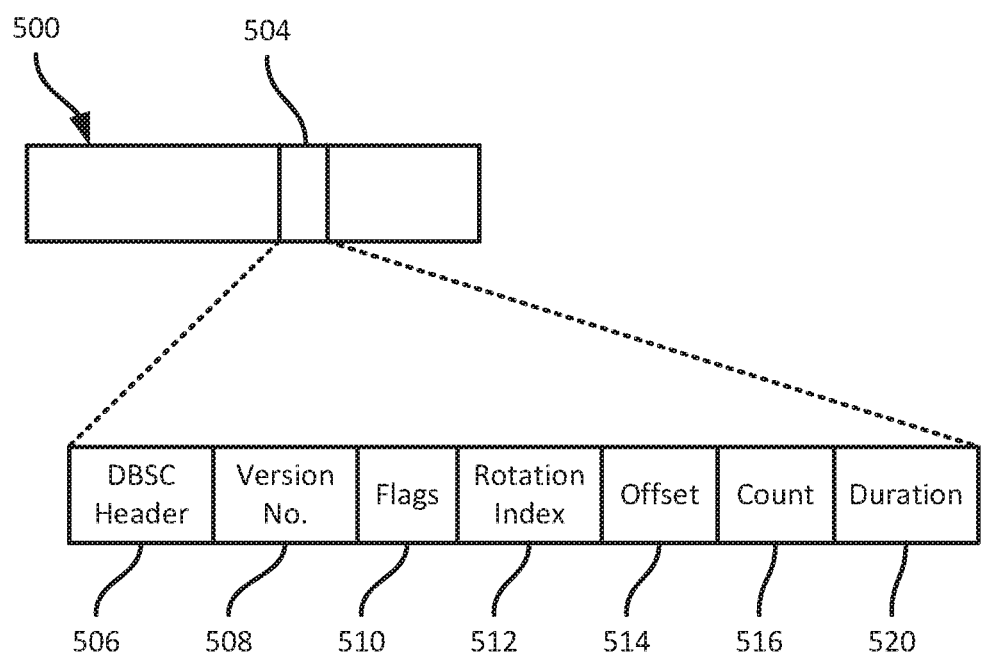
FIG. 5 is a diagram illustrating an example structure for rotation schedule data defining the rotation schedules of FIGS. 4A-4C.

The beacons transmitted at block 315, as noted above, contain rotation schedule data defining the arrangement of listening time slots implemented by the AP 104. An example of the rotation schedule data is shown in FIG. 5. In particular, FIG. 5 illustrates a beacon frame 500 including an information element (IE) 504 containing the rotation schedule data. The IE 504 can also be included in other control frames, such as probe and association frames.

The IE 504 includes various fields. In the illustrated example, the fields of the IE 504 include a directional beam scan and connect (DBSC) header, which may for example indicate the start and the length of the IE 504. The fields can also include a version number field 508, in the event that multiple versions of the IE 504 exist with different content.

In addition, the IE 504 can include a flags field 510, containing a string of bits each indicating whether a corresponding feature is enabled or disabled. An example of such features include whether rotation is enabled or disabled. Another example of a feature represented in the flags field 510 is a bit indicating whether the AP 104 is currently implementing the above-mentioned activation of successive sectors 200 according to the listening time slots. As will be seen below, under certain conditions the activation of a listening mode while rotating through the sectors 200 can be temporarily paused by the AP 104. Another example flag in the field 510 is a bit indicating whether the AP 104 has (e.g. temporarily) fixed the sector 200 on which the AP 104 is listening, which also results in pausing the above-mentioned rotation. As will be apparent, the previous two bits are mutually exclusive (i.e. if the rotation feature is active, the fixed feature is not active). Various other features are also contemplated for indication in the field 510. Examples of such features include whether the AP 104 has fixed the sector 200 on which the AP 104 is listening for a preconfigured timeout period.

In the example of FIG. 5, the IE 504 also includes a rotation index field 512, indicating an index of the current beacon relative to the total number of beacons that accommodate a full rotation through the sectors 200. For example, in the case of the implementation shown in FIG. 4A the index field 512 can simply be omitted, or can be set to zero in every beacon 500. For the example implementation of FIG. 4C, however, in which a full rotation through the sectors 200 takes two beacon intervals, the index field 512 may contain a zero in the first beacon, and a one in the next beacon. For an implementation that takes four beacons to complete a rotation through the sectors 200, the index field 512 in successive beacons may values of zero, one, two and three, followed by a return to zero.

The IE 504 can also include an offset field 514 indicating, for example, a time between the start of the DTI and the first listening time slot. Such an offset is zero for the examples shown in FIGS. 4A and 4C, but non-zero for the example shown in FIG. 4B. The IE 504 can also include a count field 516, indicating a number of listening time slots to be implemented in the coming DTI, and a duration field 520 indicating the length (e.g. in time units (TU), each equivalent to 1024 microseconds) of each listening time slot. Other information can also be included in the IE 504, such as a total number of listening time slots (which is not necessarily equal to the number of slots in a given DTI).

Various formats and content may be implemented for the IE 504. Generally, as will be apparent from the discussion above, the rotation schedule data in the beacons sent at block 315 contains sufficient information for any client device receiving a beacon to determine, for each listening time slot, both the timing of that slot and which sector 200 will be active during that slot.

Returning to FIG. 3, at block 320 following transmission of the beacons at block 315, the AP 104 implements the listening rotation defined in the rotation schedule data. That is, the AP 104 selects a first sector 200 to activate in a listening mode. At block 325 the AP 104 determines whether any client transmissions (e.g. a sector-level sweep, SLS) have been detected using the active sector 200. When the determination is negative, the AP 104 selects the next active sector 200 according to the rotation schedule data at block 320. In addition, as indicated by the dashed line to block 315, the AP 104 may transmit additional beacons depending on the configured timing of the beacons and the rotation schedule data.

As noted earlier, during transmission of the beacons and the rotating listening mode at the AP 104, the client 108 rotates through the sectors 210 in a listening mode via successive performances of blocks 305 and 310. The client 108 can activate each sector 210 for a configurable period of time. For example, the client 108 can activate each sector 210 for 100 TU, which is also the default beacon interval employed by many APs. Various other time periods may also be employed, however.

When a beacon is detected at block 310 (e.g. using the sector 210-3), the client 108 proceeds to block 330. At block 330, based on the rotation schedule data in the received beacon, the client 108 determines the timing of the listening time slot at the AP 104 that corresponds to the AP sector 200 used to transmit the beacon. That is, assuming that the beacon received at block 310 indicates that it was transmitted using the sector 200-2, the client 108 determines when the sector 200-2 will be activated by the AP 104 in a listening mode, based on the rotation schedule data. The determination at block 330 reflects an assumption that the sector 200 used to transmit the beacon that successfully reached the client 108 will also enable the AP 104 to successfully receive communications from the client 108.

The determination at block 330 can be made via any of a variety of mechanisms. For example, beacons can indicate a target beacon transmission time (TBTT), indicating times at which beacons are transmitted by the AP 104. The TBTT, and information in the beacon defining the start of a DTI relative to the TBTT, enables the client 108 to determine when the listening time slots begin at the AP 104. The timing of the start of each listening time slot can be determined based on the slot duration and count values, e.g. from the fields 520 and 516. Further, which slot corresponds to the relevant sector 200 (i.e. the sector 200 that was used to transmit the received beacon) can be determined according to the count and index fields 516 and 512.

At block 335, when the time determined at block 330 arrives (i.e, when the AP 104 is listening using the same sector 200 that was used to transmit the beacon received at block 310), the client 108 sends a communication to the AP 104. The communication can be a message initiating a sector level sweep (SLS), in some examples.

The AP 104, as noted earlier, awaits a transmission such as the SLS initiation at block 325. When the determination at block 325 is affirmative, the AP 104 proceeds to block 340. At blocks 340 and 345, the AP 104 and the client 108, respectively, exchange messages to select sectors 200 and 210 for use in further communications. For example, the client 108 may transmit data using each of the sectors 210 and the AP 104 may indicate to the client 108 which sector 210 resulted in the strongest received signal at the AP 104. The above process may also be repeated in the opposite direction, with the AP 104 transmitting data using each sector 100 and the client 108 indicating which sector 200 resulted in the strongest received signal at the client 108.

To conclude the performance of blocks 340 and 345, the AP 104 and the client 108 set the sectors 200 and 210, respectively, identified through blocks 340 and 345. Different sectors 200 and 210 may be set of transmission and reception, or the same sector 200/210 may be employed for both transmission and reception.

The performance of block 345 can also include any other suitable procedures for initiating communication between the client 108 and AP 104, such as the transmission of probe frames. The client 108 may also return to block 305 if a connection is not required at block 345.

At block 350, the AP 104 pauses rotation through the sectors 200 in a listening mode according to the rotation schedule data. Instead, the AP 104 is configured to activate the listening mode using only the sector 200 identified via the performance of blocks 340 and 345. Any beacons transmitted while rotation is paused can include a value (e.g. in the flags field 510) indicating that the AP 104 has temporarily fixed the sector 200 on which the AP 104 is listening.

At block 355, the AP 104 determines whether a connection request has been received. When no connection request is received, e.g. within a configurable time period, the pause on rotation is released and the AP 104 returns to block 315. When a connection request is received at block 355, e.g. a connection request sent by the client 108 at block 360, the AP 104 proceeds to block 365. As will now be apparent, the connection request sent at block 360 by the client 108 is sent using the sector selected at block 345.

At blocks 365 and 370, the AP 104 and the client 108 exchange data to establish a connection such as the link 112 shown in FIG. 1. The AP 104 can also continue to perform the method 300 following establishment of the connection, to enable other client devices to detect the AP 104 and request connections. When one or more client devices are connected to the AP 104, subsequent performances of the method 300 can employ modified rotation schedule data that allocates only a portion of the DTI to the rotating listening mode discussed above. The remainder of the DTI can be allocated to data exchange over existing connections to client devices. For example, the offset (e.g. illustrated in FIG. 4C) can be increased.

The scanning and connection mechanisms set out above may enable the AP 104 and the client 108 to discover one another and establish the link 112 at distances greater than may be achievable using the quasi-omni sectors 204 and 214.

Figure 6:
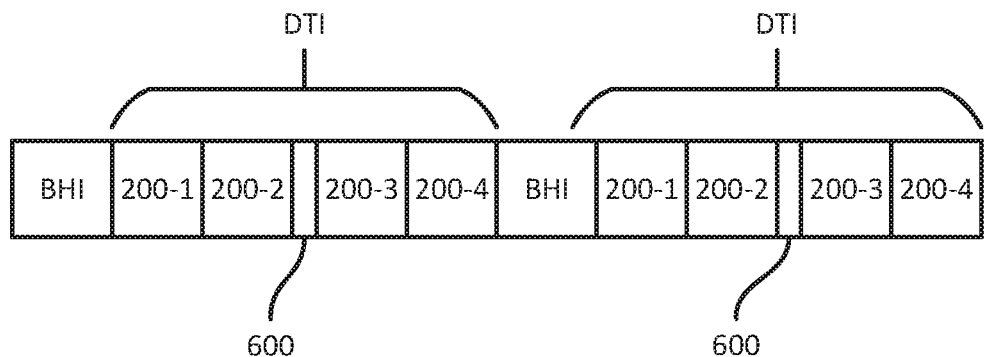
FIG. 6 is a diagram illustrating another example of a rotation schedule employed in the method of FIG. 3.

Additional variations to the above mechanisms are contemplated. For example, in some implementations the AP 104 and the client 108 can perform further actions that may accelerate the detection of a beacon by the client 108. In such implementations, as shown in FIG. 6, the AP 104 may transmit, in addition to the beacons discussed above, an auxiliary beacon 600. The auxiliary beacon 600 can be, for example, a sector-sweep-to self (SSW-to-self), a discovery DMG beacon or the like. That is, the auxiliary beacon 600 need not contain the same data as the beacons sent at block 315. Instead, the auxiliary beacons 600 can contain only a subset of the data in the beacons. At minimum, the auxiliary beacon contains sector identifiers. Further, as shown in FIG. 6, the auxiliary beacons 600 are sent during the DTI at a configurable frequency. The auxiliary beacons 600 are transmitted, like the beacons themselves, once per sector 200.

Figure 7:
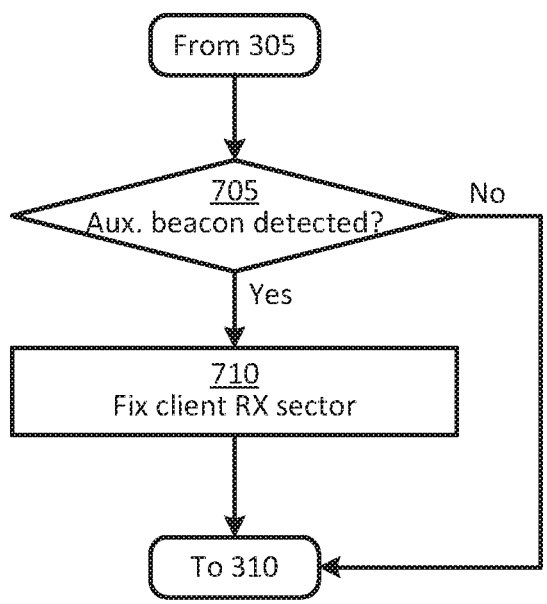
FIG. 7 is a flowchart of an additional portion of the method of FIG. 3.

The client 108, as shown in FIG. 7, can be configured to determine at block 705, which occurs after block 305 but before block 310, whether an auxiliary beacon 600 has been detected. When the determination is negative, the client 108 proceeds to block 310 as described above. When the determination at block 705 is affirmative the client 108 instead proceeds to block 710 and fixes the current client RX sector 210 before proceeding to block 310. In other words, the auxiliary beacons provide additional opportunities for the client 108 to discover a sector 210 at which a beacon may be detectable.

In further examples, the performance of blocks 305 and 310 can be repeated by the client 108 after an initial beacon detection, to determine whether another sector 210 results in a stronger detection of a beacon.

In still further variations, the quasi-omni sector 214 need not be omitted from the set of sectors employed to set an active sector at block 305. That is, the quasi-omni sector 214 can be integrated into the rotation discussed above along with the directional sectors 200.

In other embodiments, the AP 104 need not repeat the same rotation schedule for each rotation, e.g. as illustrated in FIG. 4A. For example, the AP 104 can randomize or otherwise vary the order of activation of the sectors 200 in the listening mode. In such examples, each beacon can include an indication of which listening time slot corresponds to the sector 200 that was used to transmit the beacon. In further examples, the beacon need not include such information, and the client 108 can initiate a sector sweep at block 335 for each listening time slot rather than determining which slot to wait for at block 335.

In further embodiments, when the BHI includes a portion allocated to association beamforming training (ABFT), the AP 104 can also be configured to divide the ABFT period into listening time slots as described above in connection with the DTI.

The scope of the claims should not be limited by the embodiments set forth in the above examples, but should be given the broadest interpretation consistent with the description as a whole.

The invention claimed is:

1. A method in a wireless access point (AP) having an antenna controllable to exchange data with a client device using a set of AP sectors, the method comprising:
   during a beacon header interval, while the client device monitors a first client receiving sector, transmitting a plurality of beacon instances using each of the AP sectors, each beacon instance containing rotation schedule data defining a plurality of listening time slots corresponding to respective AP sectors;
   during a data transmission interval subsequent to transmitting the plurality of beacon instances during the beacon header interval, activating a rotating listening mode using the AP sectors in sequence according to the rotation schedule data;
   in response to detecting a sector sweep initiation message from the client device using an active one of the AP sectors, communicating with the client device to select an AP sector to use in establishing a link with the client device;
   in response to communicating with the client device to select the AP sector to use for communicating with the client device, activating a fixed listening mode using the selected AP sector;
   during activation of the fixed listening mode, transmitting a further plurality of beacon instances, each beacon instance containing the rotation schedule data and an indication that the rotating listening mode is paused
   determining whether a connection request has been received from the client device; and
   when a connection request is received, establishing a connection with the client device.

2. The method of claim 1, further comprising:
   when no connection request is received within a predetermined time period, returning to activating the rotating listening mode using the AP sectors in sequence according to the rotation schedule data.

3. The method of claim 1, wherein the rotation schedule data defines at least (i) a number of listening time slots corresponding to respective AP sectors, and (ii) a duration for the listening time slots.

4. An access point, comprising:
   an antenna array controllable to exchange data with a client device using a set of AP sectors;
   a controller connected to the antenna array and configured to:
      during a beacon header interval, while the client device monitors a first client receiving sector, control the antenna array to transmit a plurality of beacon instances using each of the AP sectors, each beacon instance containing rotation schedule data defining a plurality of listening time slots corresponding to respective AP sectors;
      during a data transmission interval subsequent to transmitting the plurality of beacon instances during the beacon header interval, activate a rotating listening mode using the AP sectors in sequence according to the rotation schedule data; and
      in response to detection of a sector sweep initiation message from the client device using an active one of the AP sectors, communicate with the client device to select an AP sector to use for establishing a link with the client device;
      in response to communicating with the client device to select an AP sector to use for communicating with the client device, activate a fixed listening mode using the selected AP sector,
      during activation of the fixed listening mode, transmit a further plurality of beacon instances, each beacon instance containing the rotation schedule data and an indication that the rotating listening mode is paused;
      determine whether a connection request has been received from the client device; and
      when a connection request is received, establish a connection with the client device.

5. The access point of claim 4, wherein the controller is further configured to:
   when no connection request is received within a predetermined time period, return to activating the rotating listening mode using the AP sectors in sequence according to the rotation schedule data.

6. The access point of claim 4, wherein the rotation schedule data defines at least (i) a number of listening time slots corresponding to respective AP sectors, and (ii) a duration for the listening time slots.

7. A method in a wireless client device having an antenna controllable to transmit and receive using a set of client sectors, the method comprising;
   during a beacon header interval, activating a rotating listening mode to monitor for beacons from an access point (AP), wherein activating the rotating listening mode includes using one of the client sectors for the duration of the beacon header interval, the client sector selected according to a predefined sequence;

in response to detecting a beacon from the AP, the beacon containing rotation schedule data defining a plurality of listening time slots corresponding to respective AP sectors of the AP, determining a transmission time based on the rotation schedule data; and at the transmission time, transmitting a message to the AP.

8. The method of claim 7, wherein determining the transmission time includes:

identifying, from the beacon, one of the AP sectors used to transmit the beacon;

identifying one of the listening time slots that corresponds to the one of the AP sectors; and computing, according to the rotation schedule data, a scheduled time for the identified listening time slot.

9. A wireless client device, comprising:

an antenna array controllable to transmit and receive using a set of client sectors;

a controller connected to the antenna array and configured to:

during a beacon header interval, activate a rotating listening mode to monitor for beacons from an access point (AP), wherein activating the rotating listening mode includes using one of the client sectors for the duration of the beacon header interval, the client sector selected according to a predefined sequence;

in response to detecting a beacon from the AP, the beacon containing rotation schedule data defining a plurality of listening time slots corresponding to respective AP sectors of the AP, determine a transmission time based on the rotation schedule data; and at the transmission time, transmit a message to the AP.

10. The wireless client device of claim 9, wherein the controller is configured, in order to determine the transmission time, to:

identify, from the beacon, one of the AP sectors used to transmit the beacon;

identify one of the listening time slots that corresponds to the one of the AP sectors; and compute, according to the rotation schedule data, a scheduled time for the identified listening time slot.

\* \* \* \* \*